S. H. LANYON.
CAR WHEEL.
APPLICATION FILED APR. 23, 1908.

922,161.

Patented May 18, 1909.

Witnesses

Samuel H. Lanyon
Inventor
By C. A. Snow & Co.
Attorneys

UNITED STATES PATENT OFFICE.

SAMUEL HERBERT LANYON, OF SEATTLE, WASHINGTON.

CAR-WHEEL.

No. 922,161.     Specification of Letters Patent.     Patented May 18, 1909.

Application filed April 23, 1908. Serial No. 428,843.

*To all whom it may concern:*

Be it known that I, SAMUEL HERBERT LANYON, subject of the King of England, residing at Seattle, in the county of King and State of Washington, have invented a new and useful Car-Wheel, of which the following is a specification.

This invention relates to car wheels and has for its object to provide a car wheel which will be simple in construction, and light, strong and durable. This object is obtained by making a wheel having a web formed of one plate, said web consisting of a single plate connecting the hub with the rim, and of an undulating or serpentine form lengthwise, and radially between the hub and the rim, the folds of the undulations being preferably close together at the hub, and spread apart at the rim.

The invention consists in a car wheel constructed as hereinafter set forth and claimed.

Figure 1:
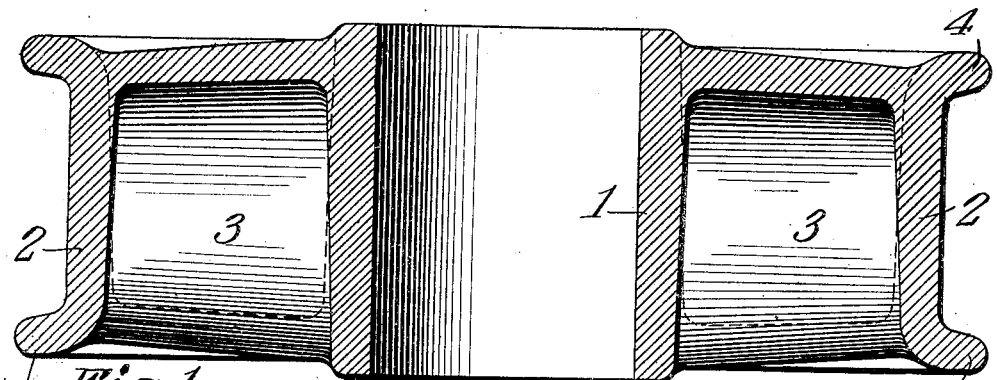
Figure 2:
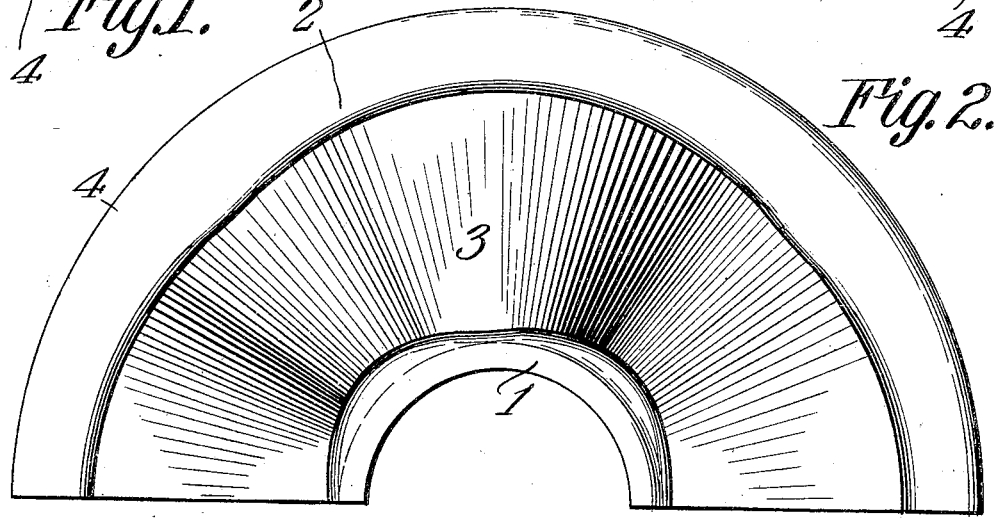
Figure 3:
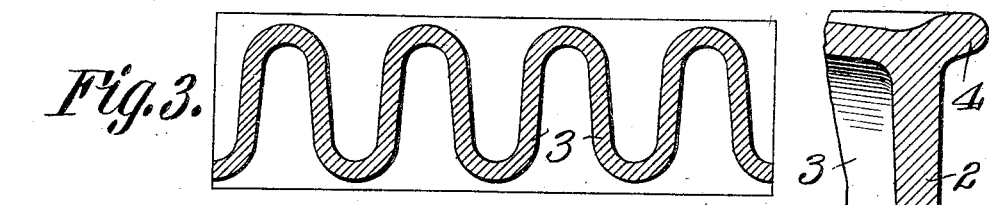
Figures 4, 5:
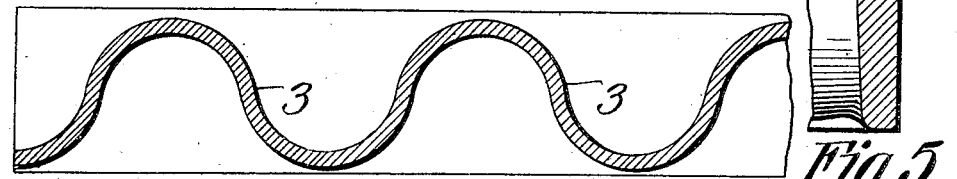

Referring to the accompanying drawing, Figure 1 is a view in transverse section of a car wheel constructed in accordance with this invention. Fig. 2 is a side view of a portion of the wheel broken away. Fig. 3 is a sectional plan view, showing in development a portion of the web at the outside of the wheel hub. Fig. 4 is a sectional plan view showing in development a portion of the web at the inside of the rim. Fig. 5 is a transverse section taken through the rim of a slightly modified form of wheel, said rim being formed with a single flange.

The car wheel forming the subject of this invention is made of a single piece casting and includes a hub 1 and a rim 2. The hub and rim are connected by a web 3 that is corrugated on lines extending radially from the axis of the wheel, the corrugations being of gradually increasing width from the hub outward to the rim and being of gradually decreasing depth from the hub to the rim.

It will be seen on reference to Fig. 1 that the width of the web as a whole gradually tapers from the hub to the rim and that the corrugations all extend on straight lines so as to better resist the strain. The depth of the corrugations at the rim is practically equal to the width of said rim so that the entire surface of the latter may be supported, while the depth of the corrugations at the hub is practically equal to the length of said hub, thus distributing the weight over the entire area of the latter. The apexes of the corrugations extend from the hub to the rim in a straight line, and they join said parts on the same side of the wheel.

In Fig. 5 is shown a modified form of wheel, the rim 2 being provided with a single flange 4.

I claim:

A single piece cast metal wheel having hub and rim portions connected by a web, the web being corrugated on lines radiating from the axis of the wheel, the width of such corrugations gradually increasing from the hub outward, the apexes of the corrugations extending from the hub to the rim in a straight line, and being connected to said parts on the same side of the wheel, said corrugations being of gradually decreasing depth and the web as a whole gradually tapering on straight lines from the hub to the rim, and the connections between the web the hub and the rim being such as to afford continuous supports for practically the full width of the rim and the length of the hub.

In testimony that I claim the foregoing as my own, I have hereto affixed my signature in the presence of two witnesses.

SAMUEL HERBERT LANYON.

Witnesses:
   SAMUEL MORRISON,
   N. I. NOLTING.